(12) United States Patent
Levitan et al.

(10) Patent No.: US 6,651,162 B1
(45) Date of Patent: Nov. 18, 2003

(54) RECURSIVELY ACCESSING A BRANCH TARGET ADDRESS CACHE USING A TARGET ADDRESS PREVIOUSLY ACCESSED FROM THE BRANCH TARGET ADDRESS CACHE

(75) Inventors: David Stephen Levitan, Austin, TX (US); Shashank Nemawarkar, Austin, TX (US); Balaram Sinharoy, Poughkeepsie, NY (US); William John Starke, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,065

(22) Filed: Nov. 4, 1999

(51) Int. Cl.[7] ................................. G06F 9/26
(52) U.S. Cl. .................. 712/238; 712/206; 712/207
(58) Field of Search ............... 712/237, 238, 712/206, 207

(56) References Cited

U.S. PATENT DOCUMENTS

| | | | |
|---|---|---|---|
| 35,794 A | * 7/1862 | Johnson | 414/658 |
| 5,168,557 A | 12/1992 | Shibuya | 712/207 |
| 5,265,213 A | * 11/1993 | Weiser et al. | 712/207 |
| 5,619,663 A | 4/1997 | Mizrahi-Shalom et al. | 712/207 |
| 5,734,881 A | * 3/1998 | White et al. | 712/238 |
| 5,809,529 A | 9/1998 | Mayfield | 711/137 |
| 5,987,599 A | 11/1999 | Poplingher et al. | 712/238 |
| 5,996,056 A | * 11/1999 | Volkonsky | 708/490 |
| 6,279,106 B1 | * 8/2001 | Roberts | 712/239 |
| 6,295,600 B1 | * 9/2001 | Parady | 711/122 |

OTHER PUBLICATIONS

Microsoft Press, Computer Dictionary, Second Edition, 1994, p. 60.*

* cited by examiner

*Primary Examiner*—Richard L. Ellis
*Assistant Examiner*—Tonia L. Meonske
(74) *Attorney, Agent, or Firm*—Barry S. Newberger; Winstead Sechrest & Minick P.C.; Mark E. McBurney (57) ABSTRACT

A method of prefetching addresses includes the step of accessing a stored instruction using a current address. During the access using the current address, a target address is accessed in a branch target address cache. A stored instruction associated with the target address accessed from the branch target address cache is prefetched and the branch target address is indexed with selected bits from the address accessed from the branch target address cache.

21 Claims, 5 Drawing Sheets

RECURSIVELY ACCESSING A BRANCH TARGET ADDRESS CACHE USING A TARGET ADDRESS PREVIOUSLY ACCESSED FROM THE BRANCH TARGET ADDRESS CACHE

TECHNICAL FIELD

The present invention relates generally to data processing devices and systems, and in particular to circuits and methods for prefetching instructions and data processing systems using the same.

BACKGROUND INFORMATION

Figure 1:
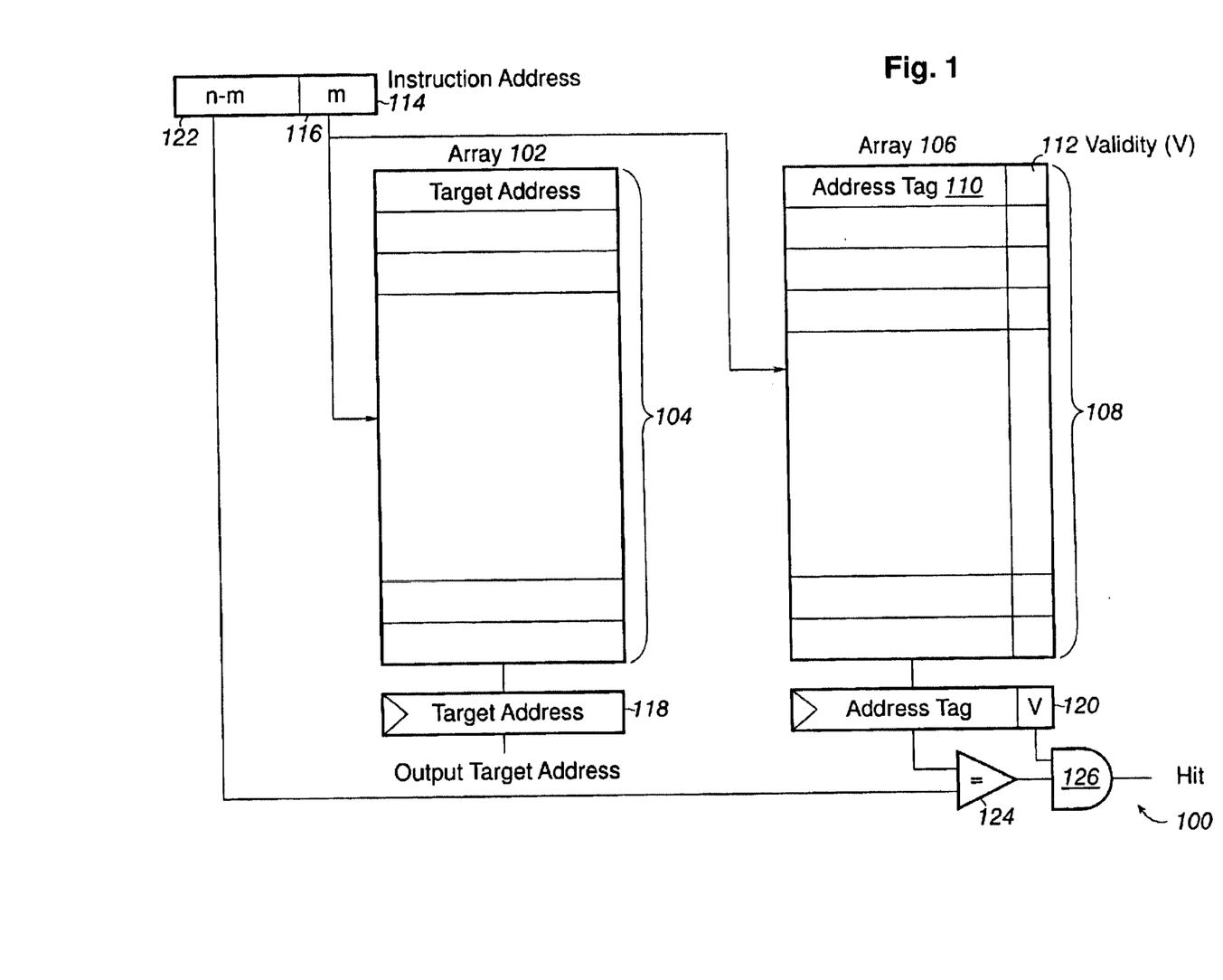
FIG. 1 illustrates, in partial schematic form, a branch target address cache which may be used in an embodiment of the present invention.

In many microprocessors, a branch target address cache (BTAC) is used to predict the target addresses of branch instructions, before those target addresses can be computed (or predicted by other, more accurate mechanisms). Generally, the BTAC is an associative memory which stores the addresses to a set of known branch instructions which is accessed with a portion of an instruction address. This may be understood by referring now to FIG. 1 illustrating a BTAC 100 which may be used with the present invention. BTAC 100 includes a pair of arrays, array 102 having a plurality of entries 104, each of which contains a branch instruction target address. Additionally, BTAC 100 includes array 106 having a plurality of entries 108. Each entry 108 includes a field 110 containing an address tag, and a field 112 holding a validity tag, which in an embodiment of BTAC 100 may be one bit wide.

An n-bit instruction address 114 provides an index to address into each of arrays 102 and 106. An m-bit portion 116 provides an index into each of arrays 102 and 106. The target address in the entry 104 accessed thereby is held in latch 118. Similarly, the address tag and validity tag from the corresponding entry 108 in array 106 is held in latch 120. The address tag, which is n-m bits wide is compared with the n-m bit portion 122 of instruction address 114 in comparator 124. The output of comparator 124 and the validity tag held in latch 120 are provided to each of a pair of inputs of AND gate 126. A BTAC hit occurs when the output of AND gate 126 is asserted, or in its logically "true" state. That is, a BTAC hit occurs when both the n-m bit portion 122 of instruction address 114 is the same as the address tag 110 in the entry 108 indexed by the m-bit portion 116 of instruction address 114, and that address tag is valid. Then, the corresponding target address which is held in latch 118 is loaded into an instruction fetch address register (IFAR) as the predicted address for the next instruction fetch cycle. This address is corrected with a better prediction within a few cycles, either by computing the correct address or by using a more accurate address prediction mechanism. BTAC 100 is a direct mapped cache, however, an artisan of ordinary skill would understand that other types of caches may be used, for example, set associative and fully associative caches, and such embodiments would be within the spirit and scope of the present invention.

When an instruction from the IFAR results in a miss to the low level (L1) instruction cache, the corresponding cache line must be reloaded from another level in the memory hierarchy. This requires a number of clock cycles. During this time, the address to the cache line causing the miss is transferred from the IFAR and stored in register such that the IFAR is available for prefetching instructions. For a high frequency superscalar processor, by the time the cache miss signal is received and processed by the IFAR control mechanism and the address where the cache miss occurred is restored in the IFAR, the BTAC has already been read for the next few successive cycles a corresponding number of addresses available for prefetching.

As a result, a need has arisen for circuits, systems and methods for efficiently prefetching instructions from a BTAC during an instruction cache miss. Such circuits, systems and methods should be capable of implementation with minimal structural or functional impact on the existing instruction processing architecture.

SUMMARY OF THE INVENTION

A method is disclosed for prefetching addresses which includes the step of accessing a stored instruction using a current address and at the same time, accessing a target address stored in a in a branch target address cache (BTAC). Instructions associated with the target address accessed from the BTAC are prefetched during the pendency of the line fill arising from the cache miss.

According to another embodiment of the present invention, a method is disclosed for prefetching instructions following an instruction cache miss by a current instruction address. The current address is used to access the BTAC. On a BTAC hit, the following substeps are performed. First, the target address from the BTAC is used to prefetch instructions into a prefetch buffer. A prefetch buffer is used to store prefetched instructions so that they may be quickly accessed without otherwise corrupting the instruction cache in the event the prefetch instructions are not used. If instructions in the prefetch buffer are used, they are also written to the instruction cache. If at the current address a miss in the instruction cache has occurred, the target address obtained from the BTAC is used to prefetch instructions during the pending instruction cache fill as before, and the target address is also used to recursively access the BTAC and prefetch instructions until the cache miss returns.

The present inventive principles are also embodied in circuits and systems. According to one such embodiment, instruction prefetching circuitry is disclosed which includes a BTAC. Control circuitry is included for accessing the BTAC and obtaining a target address therefrom in response to a hit in the BTAC. Additionally, circuitry is provided for prefetching instructions associated with the target address accessed from the BTAC. Circuitry is also provided for accessing the BTAC using the previously retrieved target address.

The present inventive principles are also directed to a data processing system which includes a memory for storing instructions and a microprocessor coupled to the memory. The microprocessor includes a BTAC for storing a plurality of target addresses to stored instructions. The instruction prefetch circuitry is operable to access the BTAC from a current address causing a miss to the instruction cache. In response to a hit in the BTAC a corresponding target address is obtained from the BTAC. Instructions are prefetched into a prefetch buffer a higher level from a selected one of instruction cache and system memory using the target address. A determination is made as to whether the instructions corresponding to the current address (giving rise to the cache miss) have been accessed from memory and, if the instructions corresponding to the current address have not been accessed from the memory, the target address previously obtained from the BTAC is used to access the BTAC for further prefetching.

The principles of the present invention provide an efficient means of prefetching instructions when a miss to the instruction cache occurs. While the instruction associated with the cache miss is retrieved from a higher level of memory in the memory architecture, the BTAC can be advantageously used to prefetch instructions which are predicted to follow from the execution of the current instruction. In other words, if the current instruction calls for a branch taken and the required instruction for the branch are already found in the prefetch buffer, a number of clock cycles can be saved.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

Figure 2:
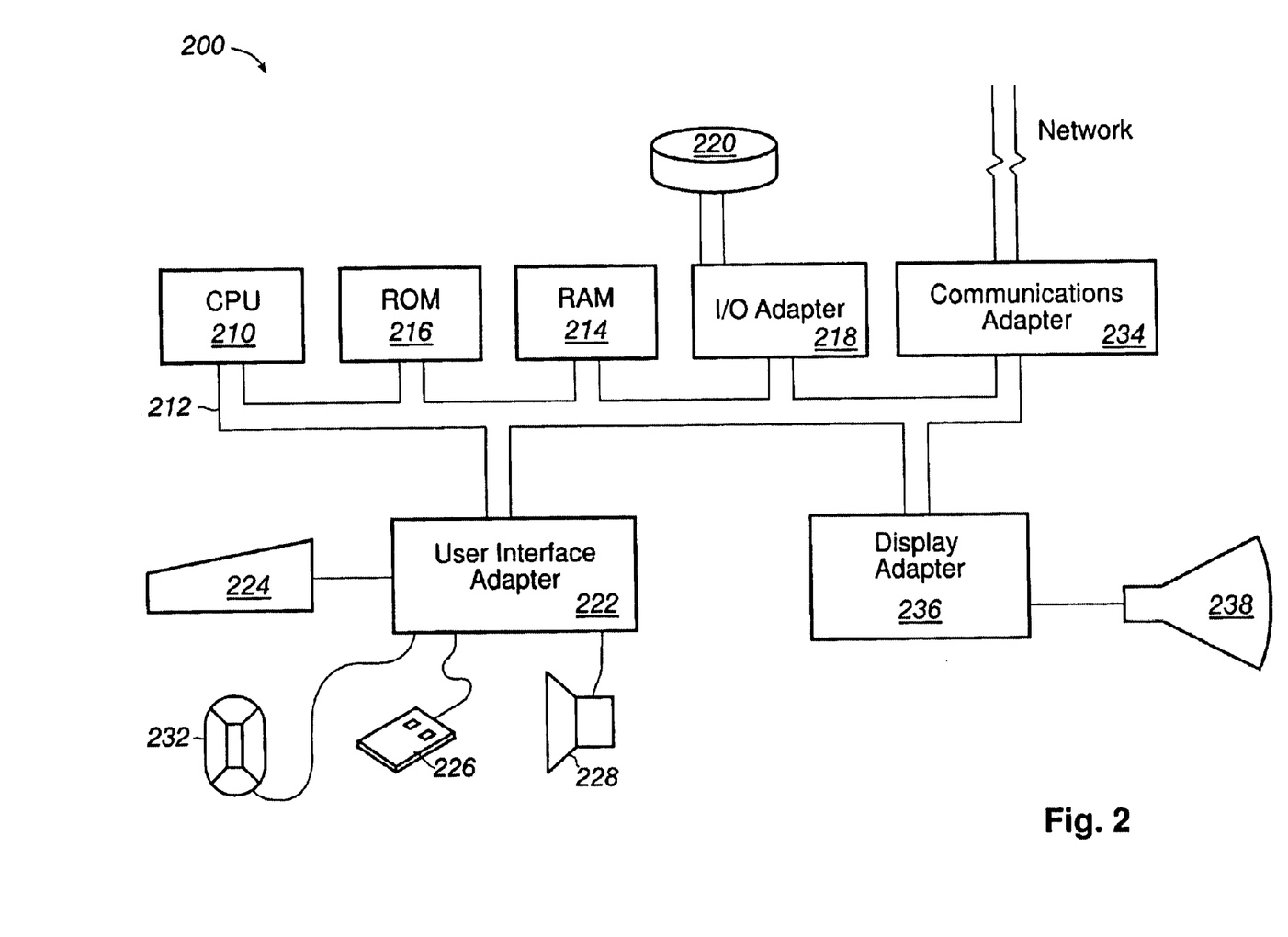
FIG. 2 is a high level functional block diagram of a representative data processing system suitable for practicing the principles of the present invention.

Referring to FIG. 2 is a high level functional block diagram of a representative data processing system 200 suitable for practicing the principles of the present invention. Processing system 200, includes a central processing system (CPU) 210 operating in conjunction with a system bus 212. CPU 210 may be for example, a reduced instruction set computer (RISC) or a complex instruction set computer (CISC). System bus 212 operates in accordance with a standard bus protocol, such as the ISA protocol, compatible with CPU 210.

CPU 210 operates in conjunction read-only memory (ROM) 216 and random access memory (RAM) 214. Among other things, ROM 216 supports the basic input output system (BIOS). RAM 214 includes for example, DRAM (Dynamic Random Access Memory) system memory and SRAM (Static Random Access Memory) external cache.

I/O Adapter 218 allows for an interconnection between the devices on system bus 12 and external peripherals, such as mass storage devices (e.g., a hard drive, floppy drive or CD/ROM drive), or a printer. A peripheral device 220 is for example, coupled to a peripheral control interface (PCI) bus, and I/O adapter 218 therefore may be for example PCI bus bridge.

User interface adapter 222 couples various user input devices, such as keyboard 224, mouse 226, touchpad 232 or speaker 228 to the processing devices on bus 212.

Display adapter 236 supports a display 238 which may be for example a cathode ray tube (CRT), liquid crystal display (LCD) or similar conventional display unit. Display adapter 236 may include among other things a conventional display controller and frame buffer memory.

System 200 can be selectively coupled to a computer or telecommunications network through communications adapter 234. Communications adapter 234 may include for example, a modem for connection to a telecommunications network and/or hardware and software for connecting to a computer network such as a local area network (LAN) or wide area network (WAN).

Figure 3:
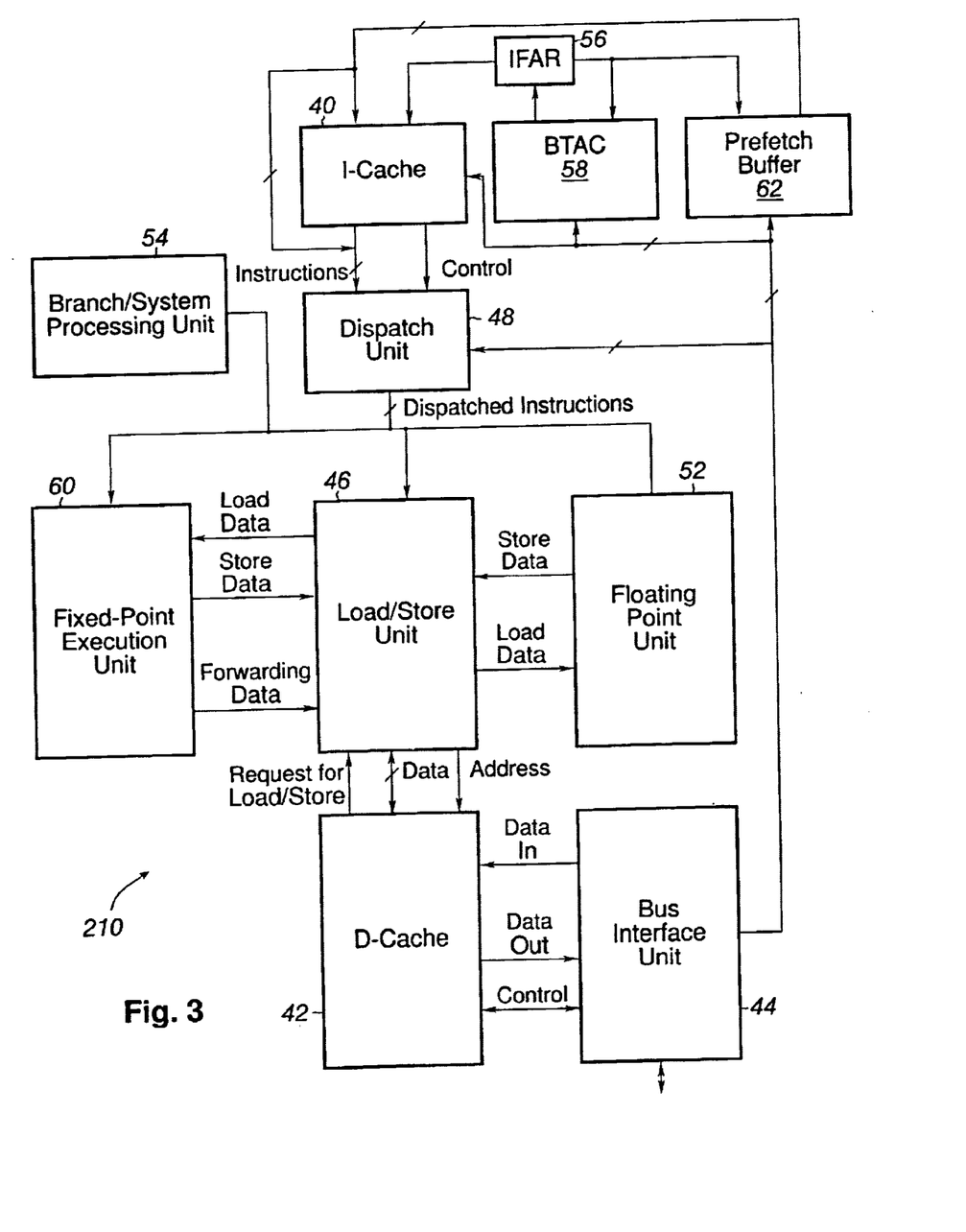
FIG. 3 is a high level functional block diagram of selected operational blocks within CPU.

FIG. 3 is a high level functional block diagram of selected operational blocks within CPU 210. In the illustrated embodiment, CPU 210 includes internal instruction cache (I-cache) 40 and data cache (D-cache) 42 which are accessible through bus 212 and bus interface unit 44 and load/store unit 46. In the depicted architecture, CPU 210 operates on data in response to instructions retrieved from I-cache 40 through instruction dispatch unit 48. Additionally, dispatch unit 48 may also receive instructions from prefetch buffer 62. In response to dispatch instructions, data retrieved from D-cache 42 by load/store unit 46 can be operated upon using either fixed point execution unit 60 or floating point execution unit 52. Instruction branching is controlled by branch/system processing unit 54.

Instruction fetch address register (IFAR) 56 maintains the address to the current instruction being fetched from I-cache 40, and as discussed below, address to instructions being prefetched upon occurrence of a cache miss. Branch target address caches (BTAC) 58 is an internal memory which stores the target addresses to a branch of instructions as previously discussed in conjunction with FIG. 1. Thus, if the current address references a branch instruction, the address to the predicted next instruction can be quickly accessed. Prefetched instructions are loaded into prefetch buffer 62.

Figure 4A:
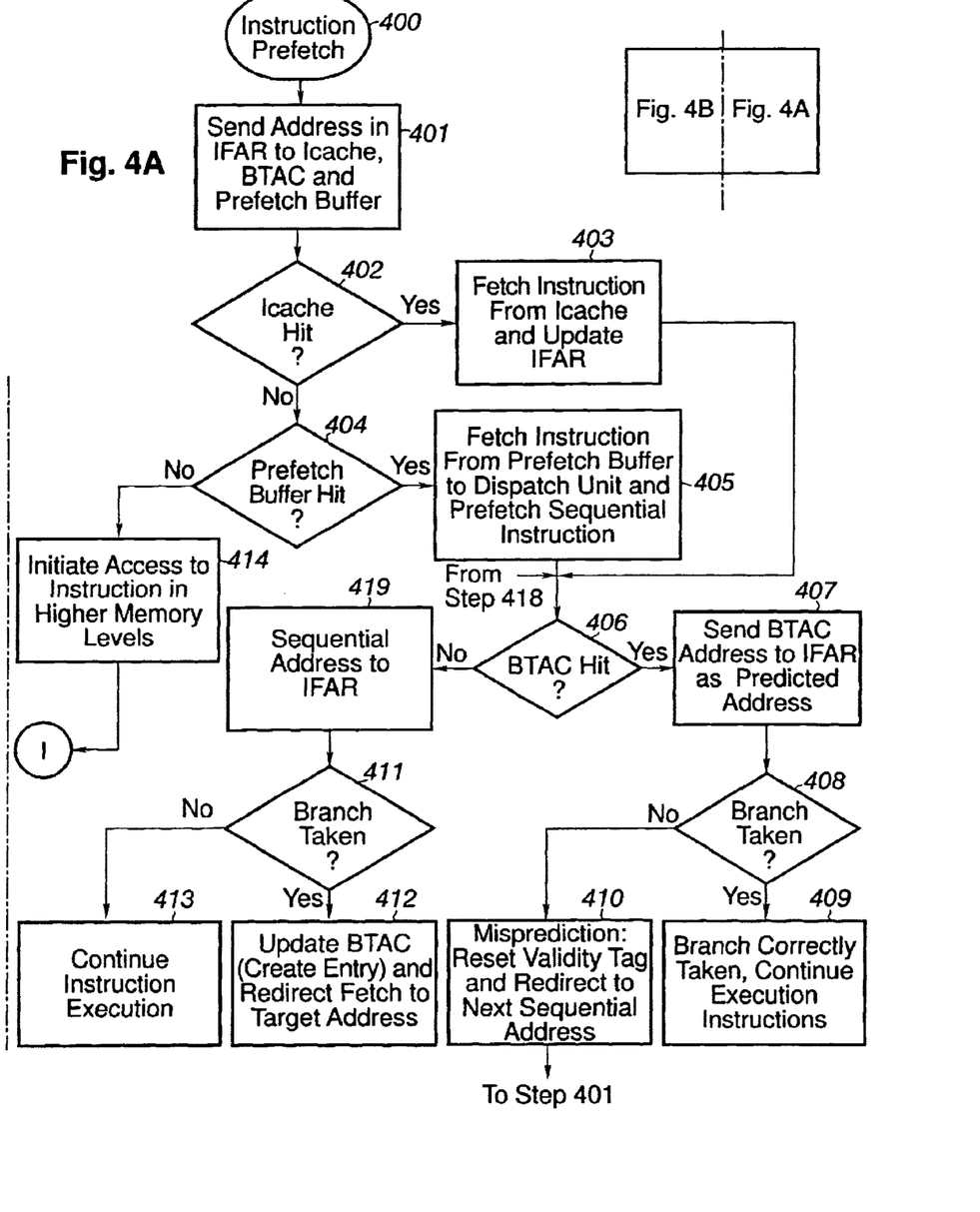
FIG. 4 is a flow diagram depicting one procedure for performing instruction prefetch operations according to the present inventive principles.
Figure 4B:
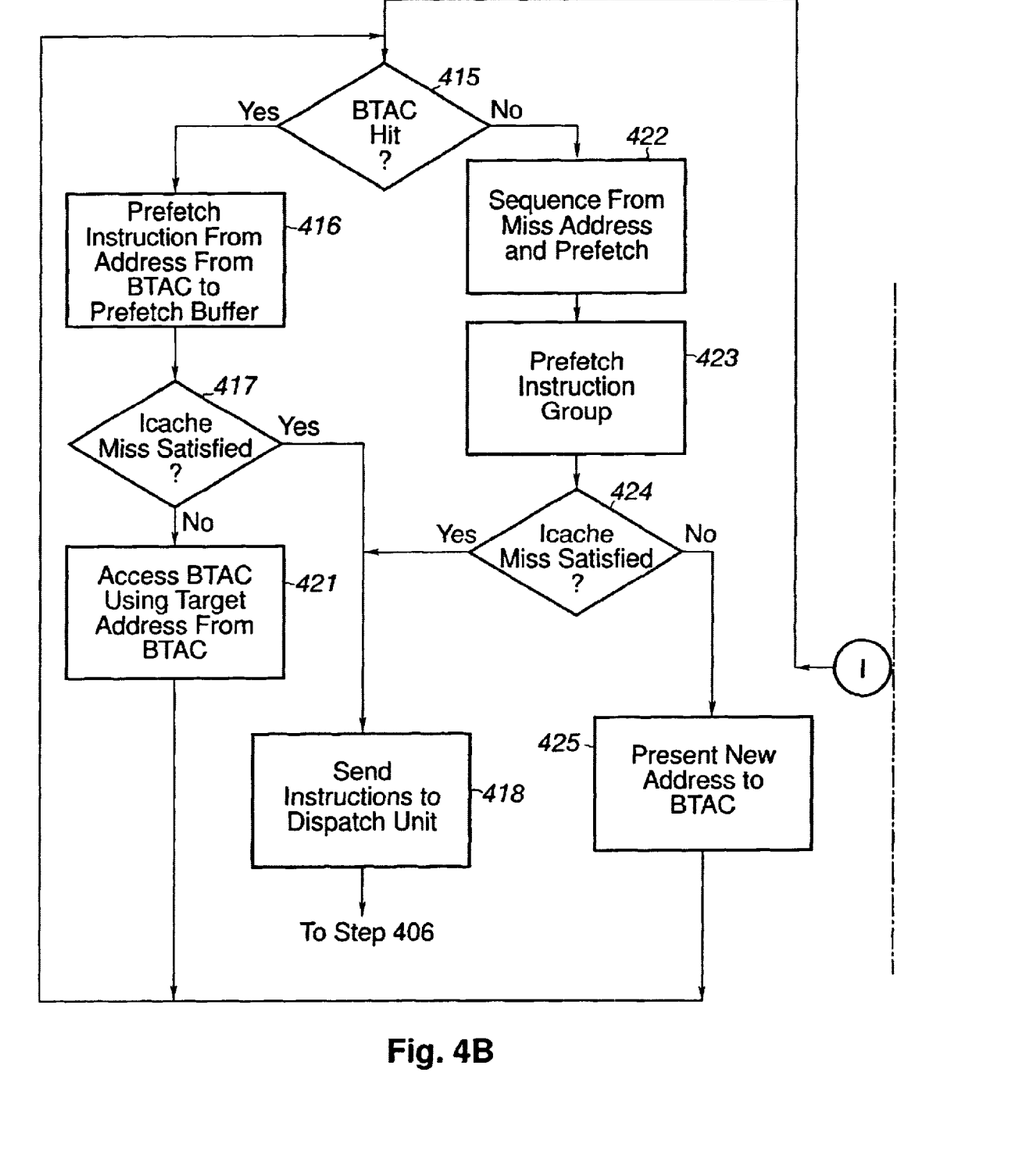

FIG. 4 is flow diagram of an instruction prefetch procedure 400 embodying the principles of the present invention. At Step 401, the addresses in the IFAR are sent to the instruction cache (Icache), the BTAC and the prefetch buffer. If the required instruction is not in the Icache, Step 402, then the address from the IFAR is used to access the prefetch buffer at Step 404. For discussion purposes, assume at this point that there is a prefetch buffer hit and the corresponding instruction is fetched from the prefetch buffer to the dispatch unit at Step 405. The next sequential instruction is also prefetched in Step 405. If however the corresponding instruction is already in the Icache at Step 402, then the instruction is retrieved therefrom and the IFAR is updated at Step 403. Process 400 then continues with Step 406.

As discussed above in conjunction with FIG. 1, each time an address is issued from the IFAR to the instruction cache, a selected number of bits from that address ("BTAC index bits" for discussion purposes) are also used to index the BTAC. Since only a selected number of address bits are used to index the BTAC, rather than entire addresses, the chance of a BTAC hit per address is increased. A reduced number of indexing bits also improves speed. If at Step 406, a BTAC hit is obtained, then it is assumed that the current instructions contain a branch instruction predicted taken. Therefore, at Step 407, the target address corresponding to the hit is taken as the predicted address for the branch, and sent to the IFAR during the instruction decode cycle at Step 407. Then, at Step 408 a test is made to determine if the current instruction was a branch taken or branch not taken. This can be the result of the decode of the current instruction or as the result of a more accurate prediction mechanism. If a branch taken condition exists, then at Step 409, the instruction prefetched at Step 407 is assumed correct, and fetching can continue without penalty. However, if it is found at Step 408 that the current instruction was not taken, then a misprediction has occurred and the address prefetched at Step 407 is flushed at Step 410. Additionally, the BTAC must be updated to reflect the fact that a hit was found against an instruction that did not result in the predicted branch being taken at execution time. In an embodiment using a BTAC such as BTAC 100 in FIG. 1, the BTAC is updated by resetting the validity tag 112 corresponding to the entry 108 in which the hit occurred. Process 400 then returns to Step 401.

Next, assume that at Step 406, no hit was found to the BTAC. Then, in Step 419, the next sequential address is entered in the IFAR. A test is made at Step 411, by instruction decode or a more accurate branch predictor, to determine if the current instruction results in a branch taken or a branch not taken. If it is found that the current instruction results in a branch being taken, then at Step 412 the BTAC is updated. Specifically, the BTAC is updated to store an entry corresponding to the current instruction address BTAC index bits and storing to the predicted target address of the next instruction required for the branch, and setting the corresponding validity tag 112, FIG. 1. The fetch is redirected to the target address found, overwriting the next sequential address loaded in to the IFAR in Step 419. If the current instruction results in a branch not taken condition at Step 411, then instruction execution continues in the normal manner, Step 412.

Now consider the case where a miss to the instruction cache occurred at Step 404 during the instruction fetch cycle. At Step 414, therefore, an access to a higher memory level in the system memory architecture is initiated (e.g., L2 cache, L3 cache, or system memory). At the same time, the BTAC index bits for the current address are compared with the indices in the BTAC at Step 415. If a hit to the BTAC occurs, and the target instruction is not in the L1 instruction cache, then the address from the BTAC is used to prefetch, instructions from the higher levels of instruction memory. The retrieved instructions are stored in the prefetch buffer, Step 416.

If it is found at Step 417 that the current instruction which triggered the cache miss has been retrieved from the higher levels of memory, the instruction cache line is sent to reload the instruction cache and is also forwarded directly, in Step 418, to the dispatch unit such as dispatch unit 48, FIG. 2, for execution. Process 400 then returns to Step 406.

When a BTAC hit occurs at Step 415, and the current address has as yet not been retrieved from higher levels of memory, then at Step 421, the BTAC index bits address accessed from the BTAC is used to index the BTAC again. The same procedure repeats, starting at Step 415 with the determination of whether the new target address results in a further hit to the BTAC and consequently, if a match occurs, the prefetch of yet another instruction into the prefetch buffer.

In the event that no matching BTAC entry is found at Step 415, the following procedure is taken. At Step 422, an address is generated by sequencing from the miss address. That is, a next sequential address is used as a prefetch address and the next instruction group is prefetched. This new address is used at Step 423 to prefetch an instruction group, which includes a predetermined number of instructions, into the prefetch buffer. At Step 424, a determination is made as to whether or not the current address has been retrieved from the higher levels of memory. If it has not, then at Step 425, the new address is used to access the BTAC, and the procedure repeats at Step 415. Otherwise, the instructions are sent to the dispatch unit in Step 418, as previously described.

Although the present invention and its advantages have been described in detail, it should be understood that various changes, substitutions and alterations can be made herein without departing from the spirit and scope of the invention as defined by the appended claims.

What is claimed is:

1. A method of prefetching instructions comprising:
   accessing a stored instruction using a current address;
   during the performance of said step of accessing performing:
   (a) accessing a target address stored in a branch target address cache;
   (b) prefetching a stored instruction associated with the target address accessed from the branch target address cache; and
   (c) again accessing the branch target address cache using the target address accessed from the branch target address cache in step (b).

2. The method of claim 1 wherein said step of accessing a stored instruction using the current address comprises the step of accessing a higher level memory after a cache miss by the current address in an instruction cache.

3. The method of claim 1 wherein said step of prefetching comprises the step of prefetching the stored instruction to a prefetch buffer.

4. The method of claim 1 and further comprising:
   comparing selected bits with a set of indices corresponding to addresses of branch instructions;
   incrementing from an address from a previous cycle having bits matching an index to an address in the branch target address cache to generate a next address for prefetching; and
   prefetching an instruction using the next generated address for prefetching.

5. The method of claim 4 and further comprising the step of indexing the branch target address cache using selected bits of the generated next address for prefetching.

6. The method of claim 5, further comprising the step of prefetching an instruction using an address from the branch target address cache in response to an index generated from said next address and not prefetching from said next address.

7. A method for prefetching instructions following an instruction cache miss by a current address comprising:
   comparing selected bits from the current address with a set of indices to a branch target address cache; and
   in response to said step of comparing, when the selected bits match an index of the set of indices, performing accessing an address corresponding to the index from the branch target address cache;
   prefetching a stored address using the address accessed from the branch target address cache into a prefetch buffer;

determining if an instruction corresponding to the current address has been accessed from memory; and if the instruction corresponding to the current address has not been accessed from memory, again comparing selected bits from the address accessed from the branch target address cache with the set of indices to the branch target address cache.

8. The method of claim 7 and further comprising the step of:

in response to said step of comparing, when the selected bits do not match an index of the set of indices, performing the substeps of:

determining an address including a set of bits matching an index of the set of indices during a previous cycle;

generating a second address by sequencing from the address from the previous cycle; and prefetching a stored instruction into the prefetch buffer using the second address.

9. The method of claim 7 and if the instruction corresponding to the current address has been accessed from memory, performing the substeps of:

determining if a current instruction is a branch taken or branch not taken instruction; and flushing the prefetch buffer and updating the branch target address cache if the current instruction is a branch not taken.

10. The method of claim 7 wherein said substep of prefetching an instruction into the prefetch buffer comprises the substep of prefetching an instruction from the instruction cache.

11. Instruction prefetching circuitry comprising:

a branch target address cache for storing a plurality of addresses to stored instructions, each address associated with an index of a set of indices;

control circuitry for comparing selected bits from a selected address with said set of indices and accessing a said address from said branch target address cache when said selected bits match a corresponding said index;

circuitry for prefetching a stored instruction associated with said address accessed from said branch target address cache during an access of an instruction, at a current address, from a memory system at higher level than on-chip cache;

wherein the circuitry for prefetching said stored instruction includes circuitry for determining if an instruction corresponding to a current address has been accessed from a memory; and if the instruction corresponding to the current address has not been accessed from said memory, again comparing selected bits from the address accessed from the branch target address cache with the set of indices to the branch target address cache.

12. The instruction prefetching circuitry of claim 11 and further comprising a prefetch buffer for storing said prefetched instruction.

13. The instruction prefetching circuitry of claim 11 wherein said instruction prefetching circuitry comprises a portion of a microprocessor.

14. The instruction prefetching circuitry of claim 13 wherein said microprocessor further comprises an on-chip instruction cache and said current instruction is detected as a miss to said instruction cache.

15. The instruction prefetching circuitry of claim 11 and further comprising:

incrementation circuitry for incrementing from an address from previous cycle having bits matching an index to an address in the branch target address cache to generate an address for prefetching; and prefetching an instruction using the generated address for prefetching.

16. A data processing system comprising:

memory for storing instructions;

a microprocessor coupled to said memory comprising:

a branch target address cache for storing a plurality of addresses to stored instructions, said addresses associated with a set of indices;

an instruction cache; and instruction prefetch circuitry operable to:

compare selected bits from a current instruction address causing a miss to said instruction cache with said set of indices and when the selected bits match an index of the set of indices:

access an address corresponding to the index from the branch target address cache;

prefetch a stored address from a selected one of said instruction cache and said memory using the address accessed from the branch target address cache into a prefetch buffer;

determine if an instruction corresponding to a current address has been accessed from said memory; and if the instruction corresponding to the current address has not been accessed from said memory, again compare selected bits from the address accessed from the branch target address cache with the set of indices to the branch target address cache.

17. The system of claim 16 wherein said instruction prefetch circuitry is further operable when the selected bits do not match an index of the set of indices to:

determine a previous address including a set of bits matching an index of the set of indices;

generate a second address by sequencing from an address from a previous cycle; and prefetch a stored instruction into the prefetch buffer using the second address.

18. The system of claim 16 wherein said memory comprises external instruction cache.

19. The system of claim 16 wherein said instruction cache comprises internal instruction cache.

20. The system of claim 16 wherein said memory comprises system memory.

21. The system of claim 16 wherein said microprocessor is fabricated on a single-chip.

* * * * *

UNITED STATES PATENT AND TRADEMARK OFFICE
CERTIFICATE OF CORRECTION

PATENT NO. : 6,651,162 B1
DATED : November 18, 2003
INVENTOR(S) : David Stephen Levitan et al.

It is certified that error appears in the above-identified patent and that said Letters Patent is hereby corrected as shown below:

Column 6,
Line 32, please replace "(b)" with -- (a) --.
Line 61, following "performing" please insert -- : --.

Column 7,
Line 37, before "said address" please delete "a".
Line 55, please replace "said" with -- a --.

Signed and Sealed this

Sixth Day of July, 2004

JON W. DUDAS
*Acting Director of the United States Patent and Trademark Office*